No. 791,714.                                                            Patented June 6, 1905.

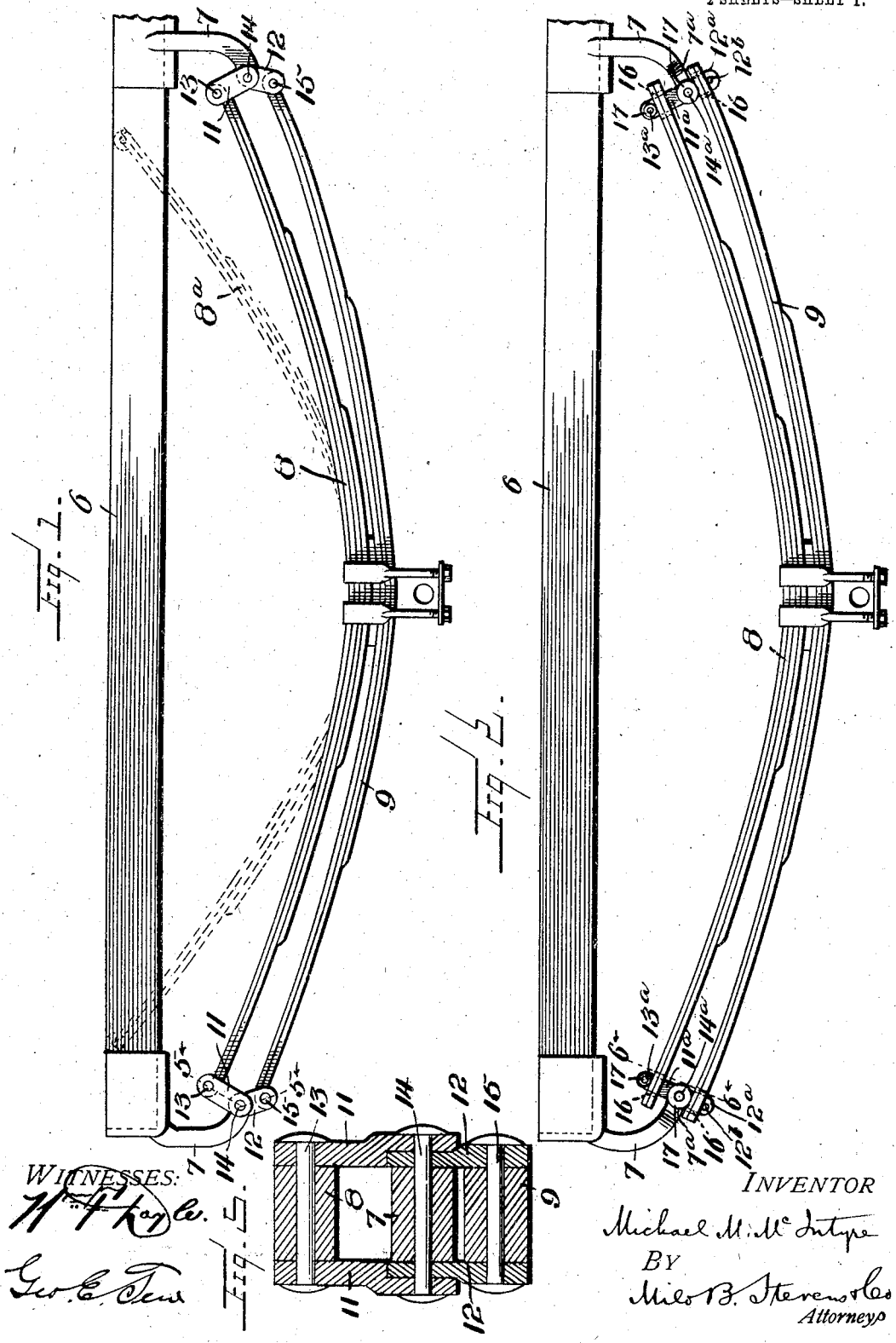

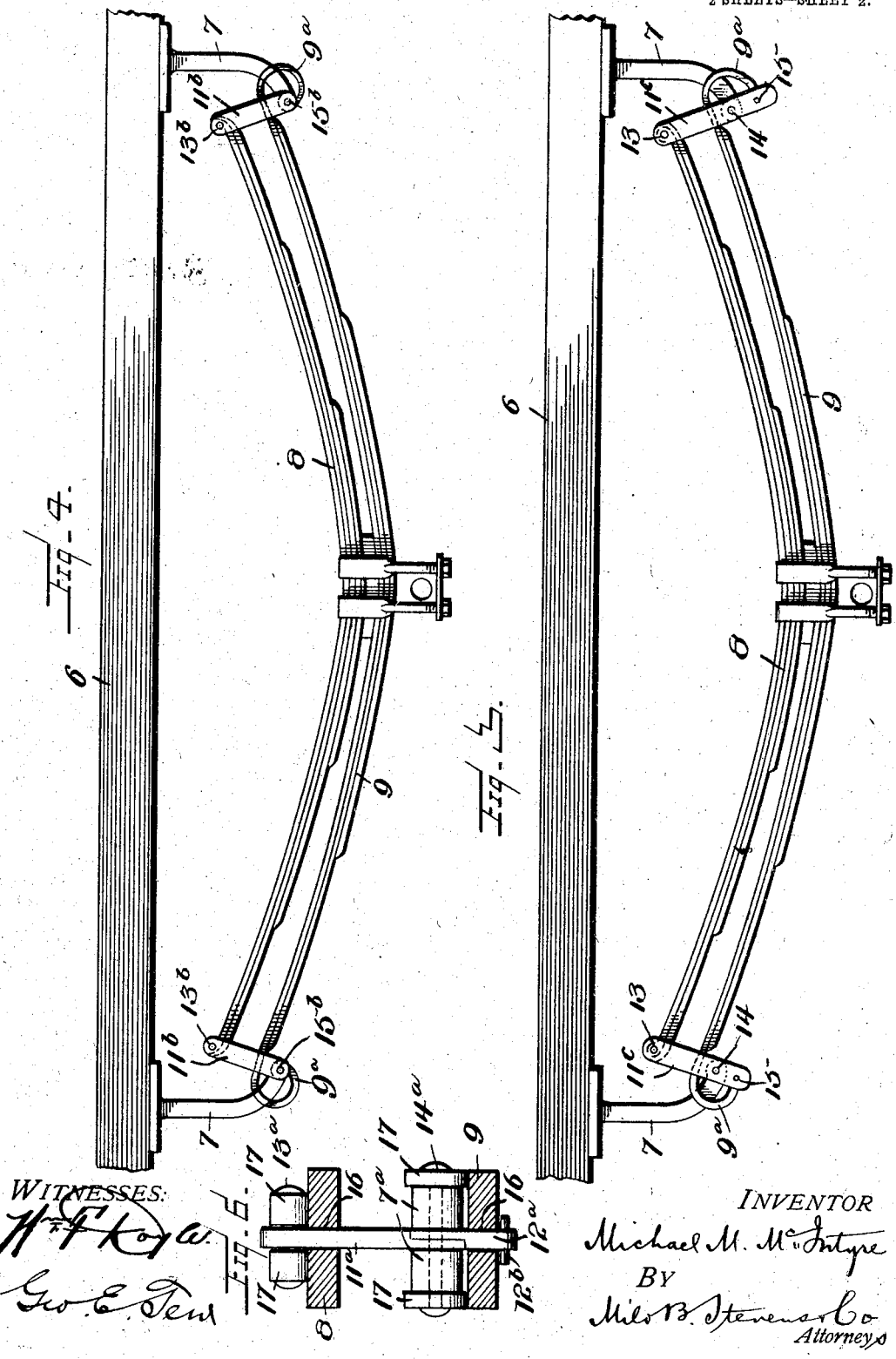

UNITED STATES PATENT OFFICE.

MICHAEL M. McINTYRE, OF CLEVELAND, OHIO.

VEHICLE-SPRING.

SPECIFICATION forming part of Letters Patent No. 791,714, dated June 6, 1905.

Application filed September 6, 1904. Serial No. 223,402.

REISSUED

*To all whom it may concern:*

Be it known that I, MICHAEL M. MCINTYRE, a citizen of the United States, residing at Cleveland, in the county of Cuyahoga and State of Ohio, have invented new and useful Improvements in Vehicle-Springs, of which the following is a specification.

This invention relates to vehicle-springs suitable especially for carriages and wagons; and it is characterized by the fact that two groups or sets of springs are used, preferably of the leaf kind, and the tension of one set is such that it supports the normal weight of the frame or body of the vehicle without load and when the vehicle is loaded the other spring comes into play and supports or assists in supporting the load placed on the vehicle.

The object and result of this construction are to give a better and easier movement to the vehicle when empty and also when loaded.

Various forms of the invention are illustrated in the accompanying drawings, Figures 1, 2, 3, and 4 being, respectively, elevations of different forms, all, however, embodying the double-spring idea referred to. Figs. 5 and 6 are details in section on the lines 5 5 and 6 6 of Figs. 1 and 2, respectively.

Referring specifically to the drawings, 6 indicates the frame or bolster of the vehicle, to the ends of which are secured in suitable form the outriders or supporting-arms 7. The upper spring, which I will designate the "carrier-spring," is indicated at 8 and the lower or load spring at 9, these springs being of the leaf kind and fastened together at the middle by clips in an ordinary manner. These springs are connected at both ends to the outriders. The tension of the spring 8 is such that it supports, when in the position shown in full lines in the drawings, the normal weight of the vehicle-body—that is, such spring if released would rise to the position, say, indicated by the dotted lines $8^a$ in the drawings, but when connected the weight of the vehicle-body causes it to take the position shown in full lines. The normal position of the spring 9 is that shown in full lines—that is, in the position shown in the drawings it supports no weight, the weight of the vehicle, as stated above, being entirely sustained by the spring 8. If, however, the vehicle be loaded, the weight of the load is taken by the spring 9, or, in other words, the combined weight of the vehicle and the load is taken by the two springs. The tension or curvature of the springs 8 and 9 is determined in advance, according to the weight of the vehicle-body, so that when the springs are applied said weight will cause the spring 8 to bend to the extent required for the attachment of the outriders 7 to both springs. This attachment may be effected in various ways, as shown in the drawings.

In Fig. 1 the springs are curled at the ends to form eyes, the upper spring being curled up and the lower spring being curled down, and the outriders are connected by links 11 and 12 and pins 13, 14, and 15, extending through the links and the eyes of the outriders and springs. Double links are used, as clearly shown in the sectional view Fig. 5.

In the form shown in Fig. 2 the ends of the leaves are left plain or flat and are slotted, as at 16. Single links are used, (indicated, respectively, at $11^a$ and $12^a$.) These links extend through the slots, and each link is provided with rollers 17, which bear on top of the respective springs. These rollers are carried by the pins $13^a$ and $14^a$, and the latter also serves to connect the outrider with the links, the eye of the outrider being forked, as indicated at $7^a$, Fig. 6, to take the link therebetween, the links being halved and lapped where the pin passes through between the forks of the outrider, as clearly shown in Fig. 6. This construction is decidedly advantageous and allows a free and easy movement, since the rollers will travel on the springs to the required extent during the various movements. A stop-pin is inserted in the lower end of the link $12^a$ to hold the same in place, as indicated at $12^b$.

In Fig. 3 the upper and lower springs 8 and 9 are connected to the outrider by rigid link $11^c$, pins 13, 14, and 15, and the spring 9 has recurved or goosenecked form at the end, bringing the eye beyond and below the outrider, as indicated at $9^a$. The links $11^c$ are rigid instead of jointed.

In Fig. 4 the goosenecked form of lower spring is shown, as indicated at 9ª, but with a different arrangement of rigid links, as indicated at 11ᵇ, each link being connected by pins 13ᵇ and 15ᵇ to the eyes at the ends of the respective springs, and the outrider is connected direct by the pin 15ᵇ, there being an absence of the knuckle-jointed links (shown in Figs. 1 and 2) heretofore described.

The double springs above described result in a very easy-riding vehicle whether it be empty or loaded.

What I claim as new, and desire to secure by Letters Patent, is—

1. The combination of two half-leaf spring-sections secured together at the middle and flexibly connected by links at the ends, one section being of proper tension to substantially equal and support the normal unloaded weight, and the other of which is active only under load, and arms connected to the links and adapted for attachment to a vehicle-body.

2. The combination with two leaf-spring sections secured together at the middle and having slotted ends, of links extending through the slots and provided with rollers bearing upon each section, and attaching-arms connected to the links.

In testimony whereof I have signed my name to this specification in the presence of two subscribing witnesses.

MICHAEL M. McINTYRE.

Witnesses:
JOHN A. BOMMHARDT,
SHIRLEY BOMMHARDT.